April 16, 1935. R. D. SMITH Re. 19,539

LIMIT TIMING MECHANISM

Original Filed Nov. 17, 1923 5 Sheets-Sheet 1

INVENTOR

Raymond D. Smith

April 16, 1935. R. D. SMITH Re. 19,539
LIMIT TIMING MECHANISM
Original Filed Nov. 17, 1923 5 Sheets-Sheet 2
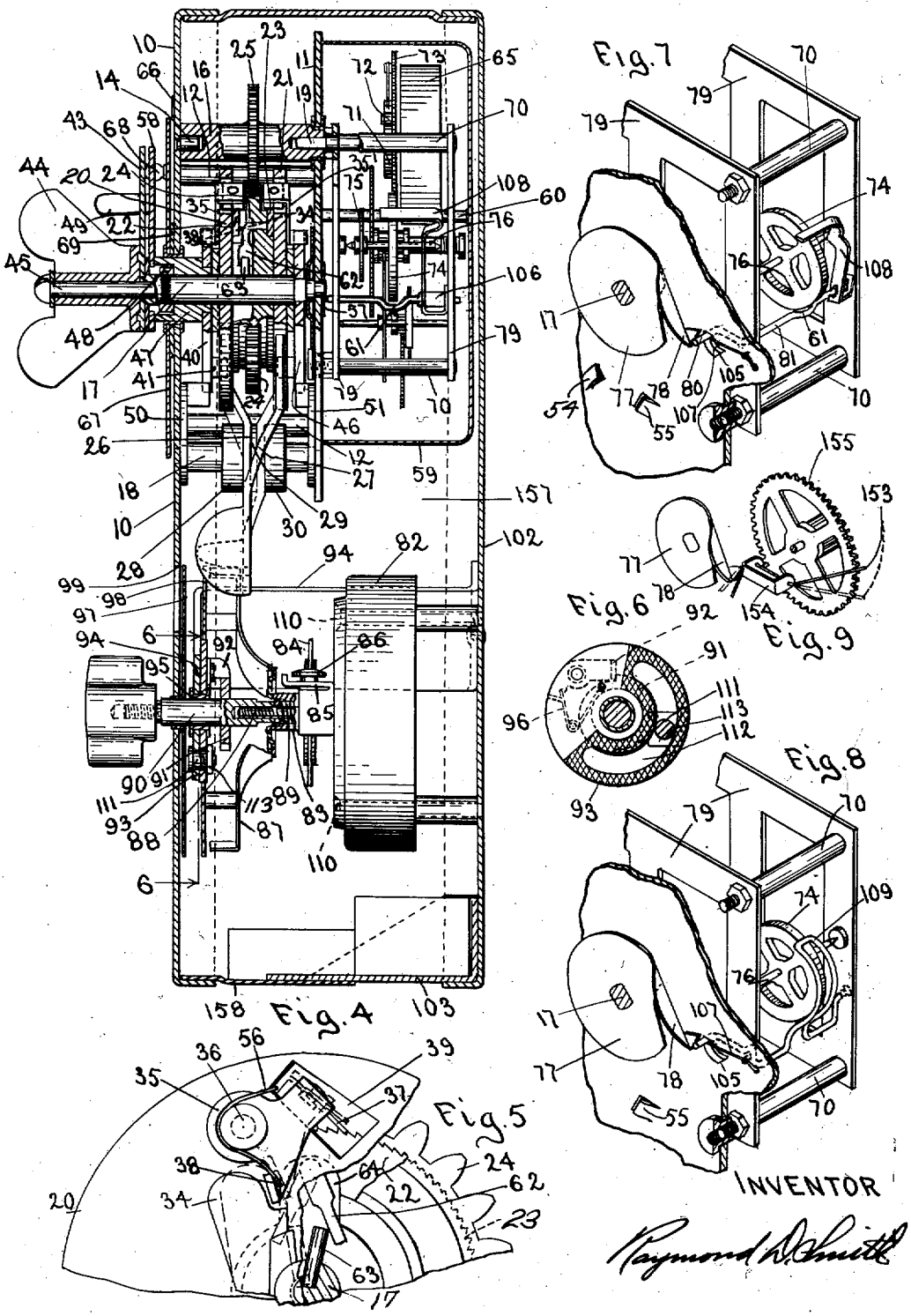

April 16, 1935. R. D. SMITH Re. 19,539

LIMIT TIMING MECHANISM

Original Filed Nov. 17, 1923 5 Sheets-Sheet 3

INVENTOR

Raymond D. Smith

LIMIT TIMING MECHANISM

Original Filed Nov. 17, 1923 5 Sheets-Sheet 4

INVENTOR

Raymond D. Smith

April 16, 1935. R. D. SMITH Re. 19,539
LIMIT TIMING MECHANISM
Original Filed Nov. 17, 1923 5 Sheets-Sheet 5
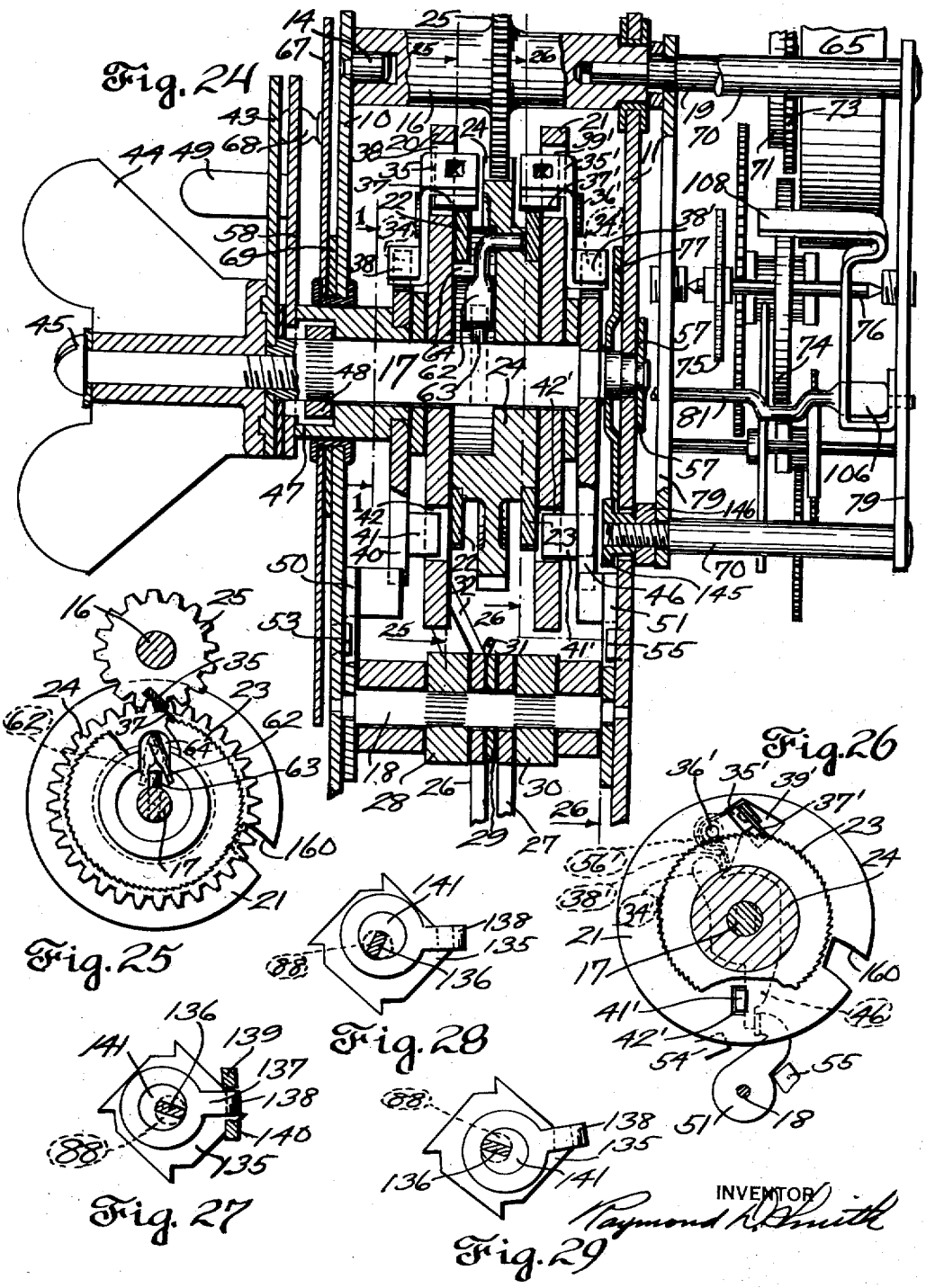

Reissued Apr. 16, 1935

Re. 19,539

UNITED STATES PATENT OFFICE 19,539

LIMIT TIMING MECHANISM

Raymond D. Smith, Fairfield, Conn., assignor, by mesne assignments, to Tremont Products Corporation, Boston, Mass., a corporation of Massachusetts Original No. 1,869,519, dated August 2, 1932, Serial No. 675,419, November 17, 1923. Application for reissue August 1, 1934, Serial No. 738,009

69 Claims. (Cl. 200—39)

This invention relates to switch timer mechanism generally similar to that described in my co-pending application Serial No. 642,496, filed May 31, 1923, and embodies modifications and improvements relating to timer mechanism in general for this and different purposes as exemplified, for instance, in the disclosure in my co-pending application 616,549, which on July 24, 1934 issued into U. S. Patent Serial No. 1,967,270, the present improvements relating more particularly to the timing mechanism and controls therefor whether the device to be actuated under time control is an electric switch, a valve, or other device, or flow control.

In the drawings, Fig. 1 is a front view of the complete switch and timer mechanism with the front box cover and the control handles removed, certain of the parts being partially broken away for clearness and one part shown in section on the plane 1—1 in Fig. 24.

Fig. 4 is a side view looking from the right at Fig. 1 showing controls for the siwtch and timer, the complete housing and certain portions of the mechanism appearing in central, vertical section.

Fig. 5 is an enlarged, fragmentary view of the pawl and the ratchet wheel by which the time movement impels the timing cams when the latter are readjusted to perform a less period of run than that for which the main spring of the time movement has been wound and shows also the flip stop and pin driving connection between the cam driving gear and its shaft whereby said main spring is wound.

Fig. 6 shows the switch cocking mechanism and is taken in section on the plane 6—6 in Fig. 4 looking in the direction of the arrows.

Fig. 7 is a perspective view of the starter parts for the time movement.

Fig. 8 is a view similar to Fig. 7 showing a modified construction.

Fig. 9 is a view in perspective showing a further modified form of starting mechanism.

Fig. 24 is a view showing certain of the parts of Fig. 4 on a larger scale.

Fig. 25 is a view on the same scale as to size as Fig. 4 and is taken on the vertical plane 25—25 in Fig. 24 looking in the direction of the arrows.

Fig. 26 is a view of similar scale to Fig. 25 taken on the vertical plane 26—26 in Fig. 24 looking in the direction of the arrows.

Figure 1:
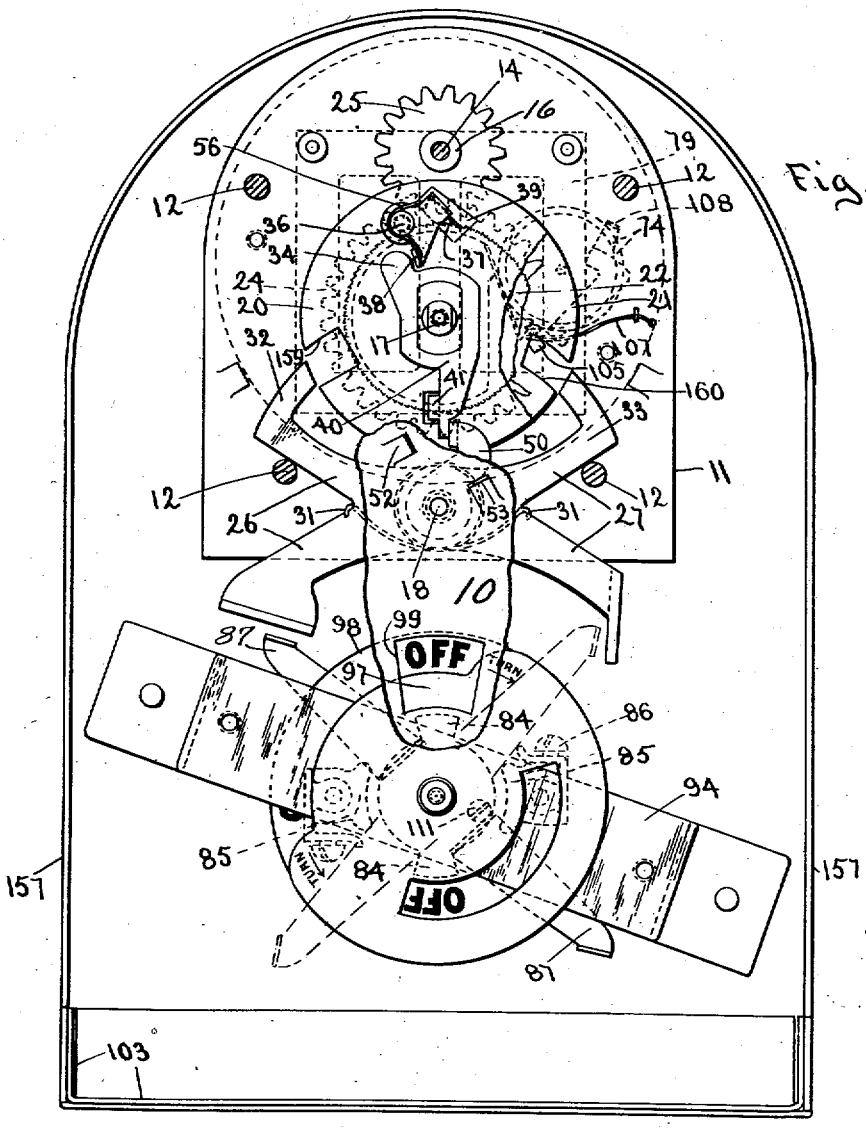

Figs. 27 to 29 inclusive show different operative positions of the detent mechanism carried by the insulating base of the switch which mechanism stations and gives a snap action to the switch contacts as operated by hand.

Throughout the drawings different views of the same part are designated by the same reference numeral.

The frame parts for the timer mechanism comprise the front box cover 10 and clock plate 11 connected and spaced by four posts 12 riveted to the box cover and the threaded rear ends of which are engaged by nuts 13 to retain the clock plate. Extending between the front box cover 10 and clock plate 11 are three shafts 16, 17 and 18. Shaft 16 at its front end is recessed for bearing on the stud 14 riveted to the box cover 10 and at its rear end is journaled in the clock plate 11 and has a square hole engaging the squared terminus of winding spindle 19 of the time movement and turns therewith. Shaft 17 affords a bearing for the "On"-action timing cam 20 and "Off"-action timing cam 21 together with the gear 24 which is flanked by the two ratchet wheels 22 and 23 keyed to respectively opposite sides of said gear to turn fixedly with it on the shaft 17. Gear 24 meshes with pinion 25 on the shaft 16 and thereby turns in fixed relation to winding spindle 19 of the clock movement.

The shaft 18 affords a stationary pivot for the "On"-action timer lever 26 and the "Off"-action lever 27 co-operating respectively with cams 20 and 21, and slightly spaced apart by the separating washer 29,—the thrust collars 28 and 30 being pressed tightly on to knurled or roughened portions of the shaft 18 to act as end thrusts with enough clearance provided to permit free turning of the timer levers, normally urged to their positions as in Fig. 1 by a spring 31, in which positions the end portions 32 and 33 of the timer levers strike respectively against two of the posts 12, 12, which serve as positioning stops therefor.

As each of cams 20 and 21 operates similarly and are correspondingly constructed their corresponding parts are indicated by the same numeral respectively primed and unprimed, and description of one of these cams and its associated parts will make plain the construction and functions of both. The cam 20 is a solid disc having a smooth periphery and turns loosely upon the shaft 17 as propelled by the ratchet wheel 22, through engagement of its teeth by the pawl member 35 pivoted to stud 36 in the cam and fixedly carrying a hardened steel blade 37 extending through an opening 39 in the cam and projecting on the other side thereof for engagement with teeth of ratchet wheel 22.

The ratchet-engaging edge of pawl blade 37 is urged against the ratchet teeth by spring 56 and seats securely in same so that when undisturbed, the ratchet wheel 22 propels the cam 20 positively in a contra-clockwise direction in Fig. 1 and Fig. 5;—ratchet wheel 22 being so driven by the winding spindle 19 of the clock movement through the medium of shaft 16 and gears 25 and 24. As it is usual practice in standardized clock movements to provide such gear ratio in the time train that the winding spindle such as 19 makes one rotation in approximately six hours, by making the gear 24 about twice the diameter of gear 25, the ratchet wheel 22 and thereby the cam 20 can be caused to rotate once in twelve hours which is a suitable maximum interval of time for most uses to which my improved interval timer is likely to be put. It will be understood, of course, that this time interval can be increased or decreased at will by providing different ratios of the gears 24 and 25.

Hand operation and rotative adjustment of cam 21 independently of gear 25 and the time movement, is effected through the medium of a trip 46 with a forwardly bent tongue 41′ having slightly lost-motion engagement with an opening 42′ through the wall of cam 21. By means of this lost motion, opposite extremity 34′ of trip 46 is enabled to press against the rearwardly turned ear 38′ of pawl member 35′ acting thus to force the pawl blade 37′ upwardly and out of engagement with the ratchet teeth when it is desired to turn cam 21 to the right independently of ratchet wheel 23. This same action takes place between "On" trip 40, "On" pawl 35 and ratchet wheel 22.

Trip 46 is fixedly carried on the rear, flatted end of shaft 17 to the forward flatted end of which the "Off" pointer 43 is secured having the wing handle 44 mounted fixedly to turn therewith by screw 45 which removably secures the same.

Trip 40 is carried on the flatted, inner end of a hub 47 and engages with an opening 42 in the wall of cam 20 and with the pawl 35, in a way similar to trip 46 relative to cam 21. Fixed to the forward end of hub 47 exterior of the casing is the "On" pointer 58 having the forwardly turned operating ear 49 which is a means for adjusting the cam 20 in either direction on the circle in the same way that cam 21 is adjusted by the pointer 43. Both the "Off" trip 46 and "On" trip 40 have a lower terminal projection adapted to engage respectively with the shiftable stop levers 51 and 50 pivoted on reduced shoulder portions of the shaft 18 and limited in their swing by tongues 52, 53 on the front box cover and by similarly located tongues 54 and 55 on the clock plate. Stop levers 50 and 51 are thus made shiftable to afford a full circle or more of travel to the timing cams 20 and 21.

Whereas in former constructions, the "On" pointer ear 49 has served as stop means for the "Off" pointer through engagement therewith by "Off" pointer 43, itself, the provision is here shown of separate stops for both the "On" and "Off" cam trips which renders the mechanisms free from dependence upon the time pointers for this function, the latter being exterior of the casing and exposed to more or less danger of damage. Whereas, also, in former constructions the end thrust for the various rotatable members on shaft 17 has been afforded by an accurate spacing of the frame parts such as the box front 10, and the clock plate 11, I have found it of good advantage in practice to provide the members assembled upon shaft 17 with self contained thrust means which in the illustrative example here shown may be afforded at the rear end by peening the shaft over upon the trip 46 forcing the latter up tightly against the shoulder shown in Fig. 4 and subsequently pressing onto the forward end of shaft 17 the thrust collar 48 fitting loosely inside a counterbore in the front end of hub 47 but pressing tightly onto a knurled or roughened portion of the shaft 17 whereby at the time of assemblage the desired amount of axial clearance may be attained by pressing collar 48 on a proper and selectable distance. This makes of the cam shaft and its carried members a unitary sub-assembly, it then being necessary after assemblage with the frame parts to provide only a thrust washer such as 57 peened onto the end of this shaft at the rear side of the clock plate.

Shaft 17 carries a radial pin 63 adapted to engage a flip stop 62 mounted to swivel in a recess 64 in the side of gear 24 and limited in its swing by the edges of this recess 64, being retained therein by the ratchet wheel 22 (see Fig. 25). The flip stop 62 is the means by which the "Off" pointer when turned clockwise in Figs. 1 and 5 winds up the clock spring 65 through the medium of shaft 17, pin 63, gear 24, pinion 25, and shaft 16 and which through the same connections prevents the clock spring from running down beyond a fixed point represented by the position of parts in Figs. 1 and 10 where the "Off" pointer is positioned opposite a stationary casing mark 66 (see Fig. 10).

It will be understood, however, that after any initial winding of spring 65 through the rotative impelling engagement of pin 63 and flip stop 62, the rotary member comprised of gear 24 and the two ratchet wheels 22 and 23 fixed thereto may be left stationary except for its very gradual return motion as effected by running of the time movement under power of spring 65, and either or both of cams 20 and 21 may be manually returned toward zero position any desired amount, and if left at some point intermediate zero and the position to which they were initially turned in winding the movement, they are nevertheless immediately and continuously impelled back to zero from such position by running of the time movement because of the fact that when trips 40 or 46 are unimpeded in their travel, the pawls 37 and 37′ will always seat in the nearest tooth of ratchet wheels 22 and 23 respectively, which engagement constitutes the usual means of coupling the cams 20 and 21 to the time movement for performing their timing function. Thereby is afforded the means for reducing or cancelling any initial time setting of cams 20 and 21 by means of pointer handles 49 or 44 without waiting for the time movement to play out the full amount of run for which it is initially energized.

A time computing dial 67 is rotatable on the front face of the box cover by means of a finger piece 68 and frictionally retained at different positions in which it is set by a cup shaped spring washer 69, bearing between dial 67 and the front box cover 10.

The simple timer movement employed includes the main spring 65, connected at its outer end to one of clock frame posts 70 which connect frame plates 79, there being four of these posts, by the projecting ends of which the clock movement as a whole is mounted loosely on the clock plate 11. The permament plain nut 146 tightly clamps the plate 11 against the shoulder on posts 70 but the movement retaining shouldered nut 145 is of greater length from its end to its head than is the thickness of plate 11 and the diameter of its shank is smaller than the hole in plate 11 through which it extends so that when nut 145 is screwed down tightly against nut 146 enough looseness exists and consequent possible shifting of the time movement as a unit relative to plate 11 to accommodate without strain or binding any slight deviation from true axial alignment of winding spindle 19 with the hub of gear 25 which it must tightly engage at its squared terminus to prevent any looseness in the operative coupling of gear 25 with spindle 19.

The inner end of main spring 66 is anchored as usual to a projection (not shown) on the winding spindle 19 to which in ordinary movement construction is fixedly secured the ratchet wheel 71 engaging with the spring pressed pawl 72 carried on the side of the largest gear 73 of the clock train. The balance wheel of the escapement is shown at 74, hair spring at 75 and balance wheel spindle at 76. A casing 59 for the movement is secured by screws 60.

A rotary snap switch of ordinary construction is shown at 82 secured to the back cover 102 of the box by screws 110 and spaced forwardly by collars 101. The square barrel, or hub, 83, of the rotatable switch blade structure carries, as usual, the contact blades 84 adapted to engage contact clips 85 secured by binding posts 86 mounted on the switch body 82, of porcelain or other insulating material. Barrel 83 also carries the double ended stop arm 87 adapted to engage at its extremities with timer levers 26 and 27, at times to be retained and released thereby. Central of the barrel 83 and projecting from its end, is the usual actuating shaft 88, which through action of the torsional spring 89 tensioned between barrel 83 and shaft 88 and in connection with the well-known star and sliding detent mechanism shown in Figs. 27, 28 and 29 at the base of barrel 83, causes the blades to perform intermittent snap movements around the circle between "On" and "Off" positions, responsive to turning of the shaft 88.

In Figs. 27 to 29 is shown how the switch blades in this common form of rotary snap switch construction are capable of being so tensioned by advance movement of the switch shaft that they are caused to perform an automatic half turn (and in two or more stages if desired) instead of the usual single quarter-turn whereby I am enabled to leave the switch so tensioned that a plurality of automatic escapements may be effected by the timer levers 26 and 27.

It will be sufficient for the clarity of this description to explain that the insulating base 82 of the switch may carry a stationary star plate 135 the points of which project out at equal radial distances from the center and which forms a bearing for the switch spindle 88. This spindle, which is a round rod throughout most of its length, may be notched to produce a flatted cross section at 136 whereon may be mounted and thereby keyed to the spindle or secured to turn fixedly therewith a circular cam 141 the center of which is eccentric to the axis of spindle 88. Arranged to surround, engage, and act as a follower for said cam in the same plane therewith is the freely slidable detent dog 137 which has a down turned finger end 138 extending into the plane of the adjacent star plate 135 for engagement with the points thereof and is held in fixed rotative relation to the switch contact rotor 83 by guide lugs carried by said rotor and shown sectioned at 139 and 140 as engaging the dog 137 on either side thereof.

As plate 135 is stationary and switch spindle 88 urged counter clockwise relative to the switch contact rotor lugs 139 and 140 by the switch spring 89, the action of cam 141 in Fig. 27 is to draw dog finger 138 radially inwardly, since rotation of the parts in a clockwise direction is prevented by one of the four projecting points on the star plate 135. This brings about and establishes the switch contact rotor always in one of the four possible stations of rest inasmuch as the permitted inward travel of dog finger 138 toward the center is not sufficient to permit cam 141 to pass its dead center alignment with the direction of pull of dog 138 inwardly against the edge of star plate 135. A quarter turn clockwise of spindle 88 and the cam 141 produces the position of parts in Fig. 28, whereupon occurs the usual quarter turn snap action of the switch rotor to the next tooth of star plate 135 in a clockwise direction to follow up the switch spindle unless the feeler levers 26 or 27 are locked to hold the switch rotor (by means of switch arm 87) from such motion.

When so locked if the switch spindle 88 be then advanced clockwise an additional quarter turn, making a half turn in all in advance of the switch rotor, then during and consequent upon this additional quarter turn, the dog finger 138 first goes a little further out radially than in Fig. 27 but before the completion of such quarter turn is partly withdrawn inwardly to a position similar to Fig. 28, although it will be observed that the cam in Fig. 29 is a quarter turn displaced from its position in Fig. 28, from which position when the switch spindle is latched so advanced and the switch rotor released for its follow up movement, this follow up movement reverses the movements of link or dog finger 138 in a radial direction, the first quarter turn still leaving the finger 138 free to escape the point of the star plate and the second quarter turn drawing the finger 138 back toward the center so that it will engage the next star plate point.

Means are required, however, to catch and hold the switch shaft in its advanced, tensioned position until such time as the switch arm 87 is released by the timing lever 26 or 27 and for this purpose I here provide the switch shaft 88 with an extension 90 adapted at its end to take the usual switch operating button 104 and having a squared portion on which is mounted the catch cam 91. This cam is capable of being retained in proper and variable rotative position by the cocking pawl 92, pressed by spring 96 into engagement with it and pivoted on the adjustor plate 93 which is secured by a hub eyelet 95 to be rotatively adjustable on the switch side of bracket 94 (see Fig. 6), which straddles the switch and is screwed or riveted at each of its ends to the back cover 102 of the box. Plate 93 is retained in its adjusted rotative position by the screw 111 passing through a hole in the switch bracket 94 and through the segmental slot 112 in adjustor plate 93 and engaging the nut 113 which in the particular design shown is itself kept from turning by its proximity to the hub eyelet 95. Bearing for the switch shaft extension 90 is thus afforded in bracket 94 without removing this bearing or separating from each other the parts of the switch cocking mechanism when removing the timer unit to expose the switch for wiring or other purposes.

Swith arm 87 carries the switch indicator dial 98 in back of bracket 94 and shaft extension 90 carries the cooperating blind 97 in front of bracket 94, both being visible in part through the window 99 in front box cover 10.

Figure 13:
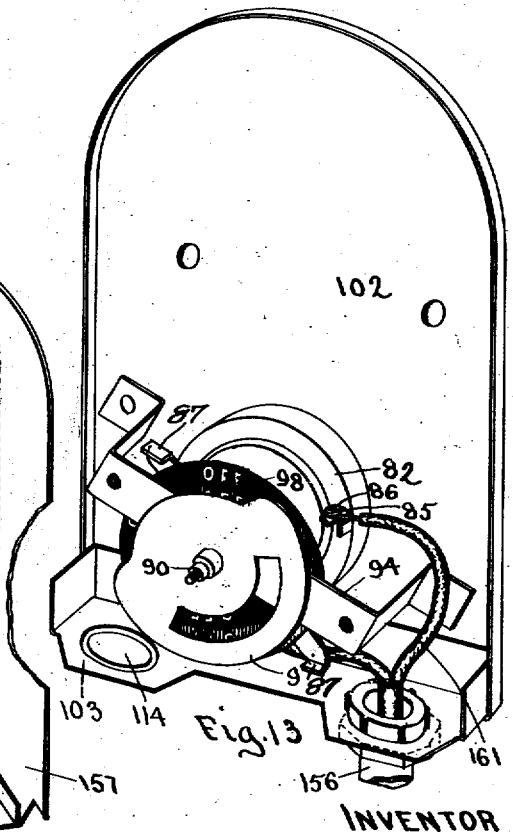
Fig. 13 is a perspective view of the back box cover showing the switch mechanism as a whole mounted thereupon, after the timer unit and front box cover of Fig. 11 have been removed.

Attention is called to the construction of the box or casing wherein the back cover 102 carries the forwardly projecting bracket 103 with knockouts 114 for the electric conduit 156 so that the latter may be fastened in place at the time the switch is wired even though the other parts of the box containing the timer mechanism are removed. In Fig. 13 the conduit is shown in place with lead wires 161 extending from same and connected to the switch binding posts. The sides 157 of the box are spot welded to the front cover 10 to form the timer-containing box cover and at their bottom these sides are tied together by a cross piece 158 which underlaps the bracket 103 in assemblage thereby forming a complete enclosure,—the assemblage of these box parts ensuring the coming together with sufficient accuracy of operating relation of the switch arm 87 and timer levers 26 and 27.

Figure 10:
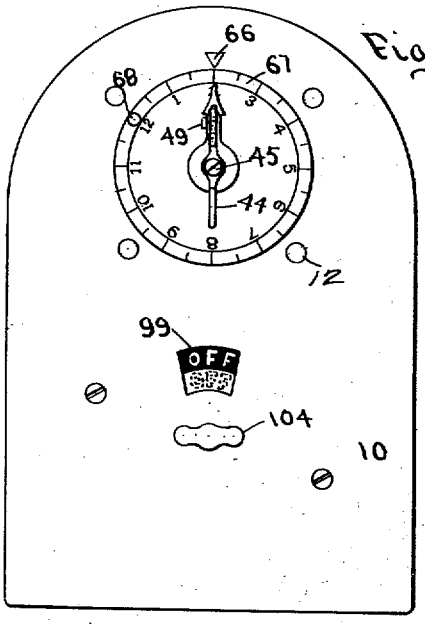
Fig. 10 is a front exterior view of the switch timer enclosed, the controls being positioned to accord with Fig. 1.
Figure 11:
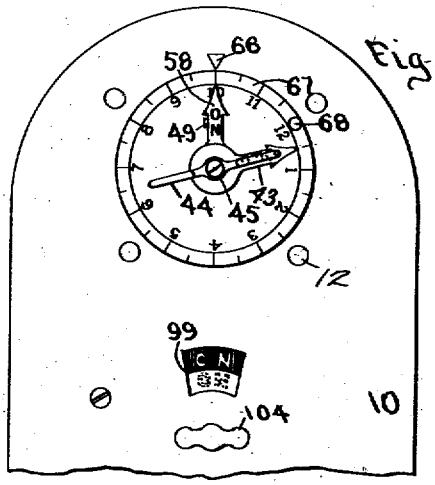
Fig. 11 is a view similar to Fig. 9, the controls being shown as when the switch is "On" and tensioned, or cocked, for automatic circuit-breaking action under control of the timer.
Figure 12:
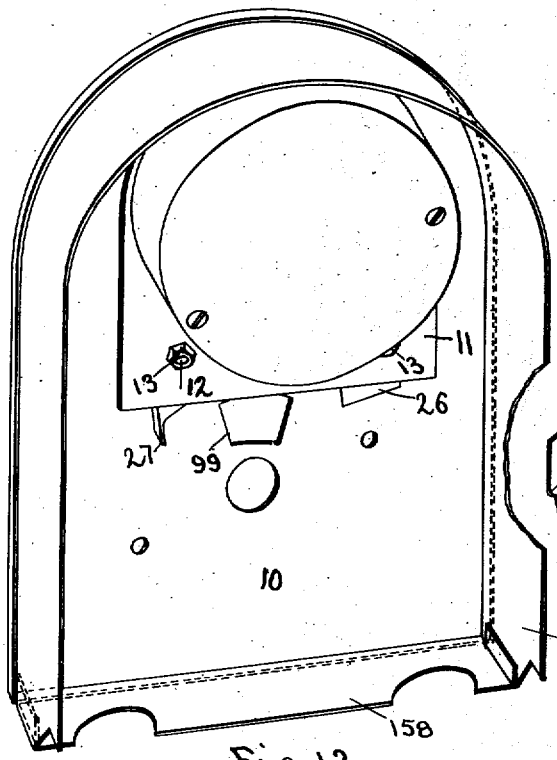
Fig. 12 is a perspective view showing the interior of the front box cover and box sides and the timer unit as a whole mounted thereupon, after the timer unit and front box cover of Fig. 11 have been removed.

In the operation of the switch timer as a whole, the switch is operated as an ordinary hand-turned switch so long as both time pointers and the timer parts are positioned as in Figs. 4 and 10, the timer levers 26 and 27 yielding to the pressure of switch arm 87 to allow the latter to pass by, themselves, dipping into notches 159 and 160 in cams 20 and 21. When either of these cams is displaced from its position as determined by stop levers 50 and 51 intercepting trips 40 and 46, by turning of time pointers 58 or 43 clockwise to set the time, timer levers 26 and 27 become thereby blocked and can not yield,—acting thereupon to restrain switch arm 87 and the contacts from rotating, so that the switch button upon being turned clockwise as though to throw the switch will merely be caught and held by catch 91 and pawl 92 leaving the switch tensioned for automatic follow-up action when the time movement has carried one or both of the time cams back to their normal stop determined position.

It will be seen that in this normal position the engagement of flip stop 62 with shaft pin 63 will prevent further running down of the movement, thus keeping the main spring 65 at or above a predetermined tension which is increased by setting the time and played out as the movement operates to return the cams to stopped position.

To insure the starting of this time movement when the time is set to control automatic switch action I herein provide a mechanism which preferably shall not require an operation distinct from that of setting the time.

The starting disc 77 which is mounted fixedly to rotate with the cam shaft 17, and thereby with "Off" time pointer 43 and its operating handle 44, carries, or is itself bent to form, a spring finger 78 adapted to swing in a path to engage the crank end 80 of the starter shaft 81 which extends forwardly through an opening 105 in the clock plate 11 and which has bearing in holes in the clock frame plates 79. At a central portion 61 the starter shaft 81 is offset to clear the balance wheel 74 of the movement and is flattened at 106 to key with a spring metal starter wiper 108 fixedly carried on the starter shaft. A spring 107 keeps the crank end 80 of starter shaft 81 pressed upwardly against the top of opening 105 which normally positions the starter wiper to free the balance wheel 74. In turning the "Off" time pointer to the right to set the time, the disc 77 is correspondingly rotated and its finger 78 immediately depresses the crank end 80 of the starter shaft swinging it against the resistance of spring 107 until the arc of travel of spring finger 78 leaves the arc of travel of the starter shaft end 80, this travel occupying a very few degrees of movement of cam shaft 17. Spring 107 then snaps the crank arm 80 smartly upward causing wiper 108 to give the balance wheel a sharp rub and set it oscillating so that starting and continued operation of the timer movement is assured.

In returning to normal position as in Fig. 1, this disc finger 78 is enabled to pass the crank end 80 of the shaft 81 by an ability to yield radially inwardly,—finger 78 being formed as a cam to this effect. Thus the starter shaft is only tripped or brought into engagement with the balance wheel when the time handle 44 is moved to the right to set the time. I could obviously provide the disc 77, or an equivalent member, with a plurality of fingers such as 78 spaced about its periphery with the effect that the balance wheel would be "kicked" more than once in the course of moving the time handle around the circle to set the time.

A modification of this starting mechanism is suggested in Fig. 8 where the crank wire 109 itself is formed to engage resiliently with the periphery of the balance wheel to perform a function similar to wiper 108. Again in Fig. 9 is shown how the starter disc 77 may actuate one end of a crank wire 153 having two bearings in a bracket 154 and at its opposite end pressed thereby tangentially into engagement with some gear 155 sufficiently sensitive in the train to readily act on the escapement wheel of the movement to set the latter in action. It will be obvious there are many other variations of starting mechanism possible and means for causing the same to receive actuation from the cam shaft 17 or some member carried thereby, or by any other desired element of the time setting system,—all under the novel principles hereinafter claimed.

Figure 2:
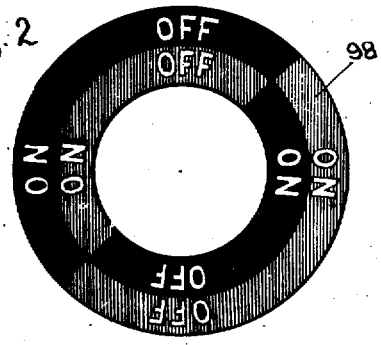
Fig. 2 shows the switch indicator dial detached.
Figure 3:
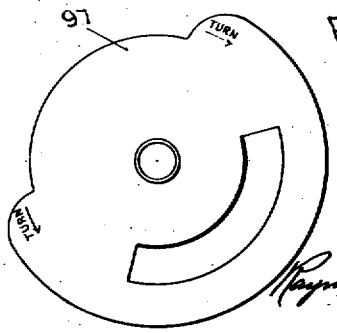
Fig. 3 shows the blind for the switch indicator dial detached.

The operation of the co-operating switch indicator dial and blind will next be described. Details of these two parts are shown respectively in Figs. 2 and 3. On the switch dial 98, I preferably color either the background or the wording differently in different sections as shown. For instance, in the form illustrated, the solid black area of the indicator represents a black background and the shaded area a red background—the letters on both backgrounds being preferably of some light color such as silver or white that will show up well in back of the window 99. Referring to the fact that in a time switch of this nature the switch operating button 104 and shaft 88 have a movement of 90 degrees or more in advance of blades 84 to store up the spring tension that causes a snap follow-up movement of the switch contacts, it will be clear that the blind 97 will be rotated forwardly to correspond and that the switch indicator will be moved only when the switch contacts themselves snap forward to perform a circuit change. The said switch shaft, when not so separated to tension the contacts for snap action, assumes a definite position relative thereto, and in this position I may shape and arrange the switch blind 97 to cover up all the portions of the switch indicator dial which have a red background, thereby exposing only that wording that appears on black background as shown in diagrammatical views, 23, 14, 15 and 16, representing respectively the four normal and untensioned positions—On, Off, On and Off—passed through by the switch blades in rotating one full circle. When the switch is tensioned for time control, either for single or double action, the switch shaft will be caught and held in a position rotatively in advance of the blades and the switch indicator, being held relatively in arrear, will bring about a relation of the blind 97 and dial 98, causing the word "On" or "Off", as the case may be, to appear on a red background in the window 99, as in Figs. 17 to 20 inclusive.

Recalling that cocking of the switch for time control, in the particular construction herein disclosed, involves setting the switch button 104 half a circle in advance of the blades 84 for double automatic action (from "Off" position to "On" and then to "Off" again) and involves only a quarter turn for single automatic action (from "On" position to "Off" only) the relative positions of these parts as shown in the series of diagrammatic views in Figs. 14 to 23 inclusive will be obvious from the following brief description of these figures, it being noted that red, or whatever distinguishing means is employed, cannot appear in the window unless the switch is cocked and under control of the timer, and that the switch cannot be cocked and put under control of the timer without causing red thus to show in the window.

Figure 23:
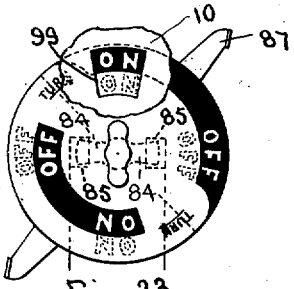
Figs. 14 to 23 show diagrammatically different positions of the novel switch indicator parts and are more particularly described hereinafter.
Figure 17:
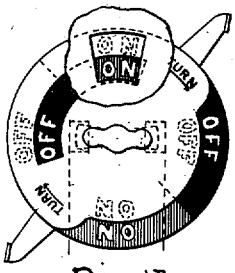
Figure 14:
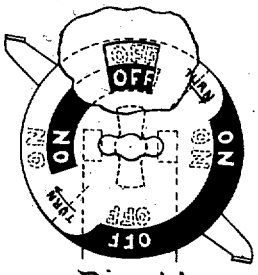
Figure 18:
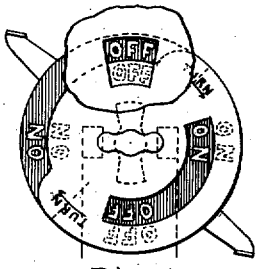
Figure 15:
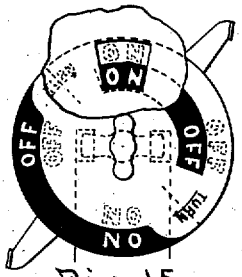
Figure 19:
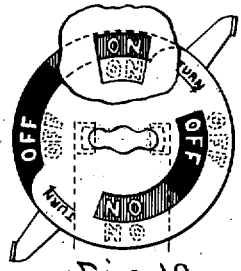
Figure 16:
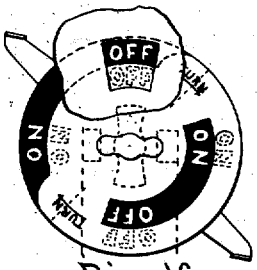
Figure 20:
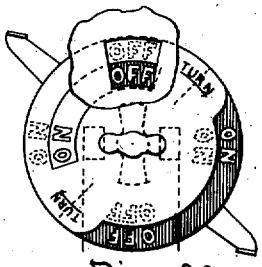

In Figs. 23 and 15 the switch is in normal circuit-breaking position. In Figs. 14 and 16 in normal circuit-breaking position. In Fig. 17 the switch from position in Fig. 23 has been tensioned for single time controlled action and upon so acting will assume the position in Fig. 14. In Fig. 18 the switch from position in Fig. 14 has been tensioned for double time controlled action and upon the first action will assume the position in Fig. 19 and upon second action will assume the position in Fig. 16. In Fig. 19 the switch from the position in Fig. 15 has been tensioned for single time controlled action and upon so acting, will assume the position in Fig. 16. In Fig. 20 the switch from position in Fig. 16 has been tensioned for double time controlled action and upon the first action will assume the position in Fig. 17 and upon the second action will assume the position in Fig. 14.

Figure 21:
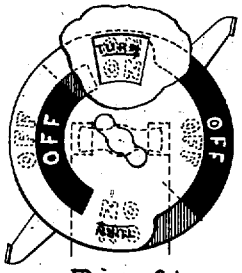
Figure 22:
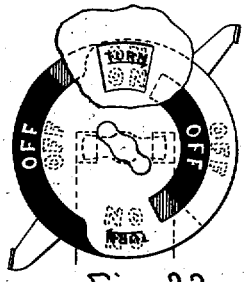

Due to a peculiarity of some common forms of commercial snap switch mechanism, it is possible, from causes other than the engagement of catch 91 by pawl 92, that the button 104 be caught and held and at a less distance in advance of its normal "On" position than is required to operatively tension the switch for circuit-breaking action. In this case a condition will result as shown in Figs. 21 and 22 where the blind has not traveled the entire quarter circle necessary to clear the window. In such case I may advantageously provide markings such as the word "Turn" on the blind to indicate to the uninformed operator that the button should be turned further to the right to properly tension the switch for timed action. It will be noted that here neither the word "On" nor "Off" is visible, the blind obscuring the entire part of the indicator which otherwise would be visible in the window.

Obviously, all forms of starting mechanism herein disclosed are applicable to ordinary one day alarm clocks whereby the mere act of winding the clock would insure its starting without shaking the clock after winding as is now commonly resorted to.

In none of the following claims is limitation to be ascribed to the exact constructions herein illustrated beyond such interpretation of the claimed combinations as is required to define true and useful novelty over prior accomplishments in this art. The present improvements are useful and applicable in time controlled devices other than electric switches and are not to be understood as limited thereto. The application of the novel indicator principles herein disclosed would be obvious, for instance, in gas valve timing devices such as disclosed in the applicant's United States Letters Patent, Serial Nos. 1,348,756; 1,385,098; and 1,468,580. In such application, the combination dial 98 and blind 97, or some modified forms thereof or equivalents therefor might indicate not only whether the gas valves were open or closed but would tell also whether, or not, it were tensioned for action and under control of the timer.

I claim:—

1. In a flow timer, in combination; time-setting means, a flow governor, an actuator for said governor separate from said means and arranged for movement to establish said governor under time control, a signal shifting in response to movement of said governor to indicate the flow affecting position thereof, and further conditioned by movement of said actuator also to indicate whether said governor is under time control.

2. In a flow timer, in combination; time-setting means, a flow governor, an actuator for said governor separate from said means and arranged for movement to establish said governor under time control, a signal shifting in response to movement of said governor to indicate the flow affecting position thereof, and additional indicating means responsive to movements of said actuator thereby to differently condition said signal respectively when said governor is and is not under time control.

3. In combination; time control mechanism, a uni-directional rotary flow governor having a flow affecting member tensionable to effect its time controlled action and similarly positionable both when and when not so tensioned, indicator means operative independent of said time control mechanism and showing the flow affecting position of said member, and further indicating whether or not said member is tensioned for time control.

4. In combination with a flow timer having a casing concealed flow governor, an actuator movable both with and relative to said governor and operable from the outside of said casing, and signal means visible from outside said casing indicating the position of said governor and differently conditioned respectively by movements of said actuator with and relative to said governor.

5. In combination with an enclosing housing for a time control unit said housing comprising separable and conjoined body and cover sections, a device to be enclosed by said housing when assembled and to be conditioned for automatic time controlled action and carried by said body section, timing mechanism to be likewise enclosed by said housing and carried by said cover section, and co-operating mechanical parts belonging respectively with said device and with said timing mechanism, said parts being movable between definite normal positions and being constantly biased to some one of said positions, the operative relation of said parts and their relative positioning as carried by said different housing sections being such that assemblage of said sections brings said parts into their designed operating relation irrespective of which of their normal positions they occupy at the time of such assemblage.

6. In a timing mechanism embodying a spring driven time movement and a time setting handle, connections enabling said handle to be operatively impelled by said movement in manually variable relation thereto, and connections between said movement and said setting handle whereby actuation of the latter energizes and starts said movement.

7. In timing mechanism, a spring driven timing movement, means to stop said movement and limit the running down of its driving spring, and a handle to wind up said spring together with means to set said movement in action, said means being operated by said handle when the latter is moved to wind up said spring.

8. In a timing mechanism embodying a time movement adapted to stop running at the expiration of the interval to be timed, a handle to reset said movement for further timing action and thereafter propellable by said movement, and means operated by said first means to set the movement in operation again.

9. In a timing mechanism embodying a marine movement, a handle connected to wind up and predetermine the timing action of said movement and propellable afterward thereby, and mechanism operated by said handle and acting upon an element of said movement to insure the starting of same.

10. In a timing mechanism, the combination with a main spring, and a train connected balance wheel, of a winding arbor for said spring, an arbor propelled setting handle for turning the said arbor and winding the said main spring, and means operated by said setting handle for starting the balance wheel of said train swinging.

11. In a time switch, in combination, time setting means, a switch contact, an actuator for said contact separate from said means and arranged for movement to establish said contact under time control, a signal having respectively different portions thereof exposed by successive movements of said contact to indicate the circuit affecting position of said contact and means operated by movement of said actuator to further influence what portions of said signal shall be exposed.

12. A timing mechanism embodying a spring driven time movement conditionable to complete a cycle of action, a device the setting of which both winds said movement and determines the duration of said cycle, and connections between said device and movement whereby the movement is set in operation when it is being wound.

13. In a timing mechanism, an indicator movable in unison with the device to be timed, an actuator movable to establish said device under control of the timing mechanism, and a blind movable in unison with the said actuator to conceal and expose respectively different portions of said indicator.

14. In a timing mechanism in combination; a time giving movement embodying a train of timing gears mounted between frame plates, a support on which said movement is loosely mounted for limited shifting of position, agitating mechanism to start said movement in operation and carried by the said frame plates and having an operating extension, actuating devices mounted on said support and adapted to engage said operating extension, and means on said support to engage with said operating extension thereby to help position the same for accurate cooperation with said actuating device.

15. In a time controlled flow governor, in combination, an indicator dial having a plurality of segments marked respectively to indicate different flow affecting conditions of said governor, each of said segments having a radially inward portion differently marked from a radially outward portion in the same segment, and means to expose one of said portions of the segment while the other is concealed and vice versa to indicate respectively different conditions of said governor.

16. In a double action returnable timer mechanism, a spring driven timing movement, timer cams propellable by said movement in a common direction to their respective normal positions at rest, operating handles to move said cams in the opposite direction and to relatively position them for individually selective periods of travel back to their said normal positions, and two independent stops acting respectively to arrest each of said cams by opposing its return travel as caused by said movement when said cam has been returned to its normal position by said timing movement.

17. In a double action resettable timer, two separately adjustable time setting pointers concentrically pivoted, a handle upstanding from one of said pointers for independently manipulating same in all positions and formed to prevent the travel of the other pointer therepast, and a handle formed for independent manipulation of said other pointer and in no way interfering with the travel of said first pointer.

18. In a timing device, a spring driven time movement, an arbor for winding the spring of said movement, and means actuatable by the winding movement of said arbor to set said movement in motion.

19. In a timing device, a spring driven time movement, an arbor connected to wind the spring of said movement, a time setting handle operative to rotate said arbor and also rotatable thereby, and means actuatable by said handle to set the movement in motion.

20. In timing mechanism in combination a timer rotatably displaceable from a stop-determined position, a normally idle spring driven time movement operative to impel said timer in a reverse direction to its said position, and mechanism to set said timer movement in operation and actuated by the said displacement of said timer.

21. In combination, a time movement, starting mechanism arranged normally to free the same and operative when actuated to agitate said movement for starting, a timer impellable in one direction by said movement and operative to actuate said starting mechanism when moved in the reverse direction.

22. A starting mechanism for a time movement embodying in combination, a reciprocating wiper spring-urged to a position to free the active parts of said movement, and movable against the action of said spring into engagement with one of said parts, an actuator for so moving said wiper and impellable by said movement but inoperative upon said wiper when so impelled.

23. In timing mechanism in combination with a time movement and its winding handle, mechanism to agitate and set in operation said movement and including an operating projection, an actuating projection movable into engagement with said operating projection by said winding handle, said two projections engaging and passing each other in both directions of relative travel but operating said mechanism to agitate the movement only when said handle is turned to wind the movement.

24. In timing mechanism, a time movement having a marine escapement and an oscillatory balance wheel, a pivoted wiper ridable into wiping engagement with said balance wheel to start said movement and spring urged out of such engagement, a crank arm for moving said wiper, an actuator for said wiper including a projection whose arc of travel intersects the arc of travel of said crank arm whereby said crank arm and said projection may engage and escape to operate the former in one direction of passing, said actuator being propellable by said movement in the other direction of passing.

25. In combination, a manually operable device and mechanism to time an automatic action thereof, a separable two part casing in one part of which said mechanism is mounted and in the other part of which said device is mounted, and means to establish said device under tension to effect its said automatic action, said means being carried by the part of said casing on which said device is mounted and separable therewith from the other part of said casing.

26. In timing mechanism, a main timing arbor, a movement impelled gear rotatable on said arbor and flanked on both sides by ratchet teeth, separately rotatable timer discs positioned on respectively opposite sides of said gear adjacent said ratchet teeth, rigid pawl members pivotally mounted on the sides of each of said discs opposite said ratchet teeth and extending through an aperture in each of said discs for protrusion on the ratchet teeth sides of said discs and engaging said ratchet teeth, and trip members having lost motion propelling engagement with said discs and operating on said pawl members at the sides of said discs to which said pawls are pivoted thereby to release said pawls from said ratchet teeth for adjusting the time setting of said discs relative to said gear.

27. In timing mechanism, in combination, a main timing arbor, a central movement-connected gear rotatable on said arbor, front and rear timing discs separately rotatable on opposite sides of said gear and coupled thereto by pawl and ratchet drive connections, a rear trip member carried by said arbor at the rear of said rear timing disc for propelling same and operative when moved in one direction to uncouple the latter's pawl and ratchet drive connection to said gear, a front trip member loosely rotatable on said arbor at the front of said front timing disc for propelling same and operative when moved in one direction to uncouple the latter's pawl and ratchet drive connection to said gear, and separate time setting controls for manual operation of said two trips to adjust the latter's coupled relation to said gear.

28. In timing mechanism, in combination, a casing therefor, concentric time setting handles exterior of said casing, concentric journals extending to the interior of said casing for transmitting the action of said handles to the mechanism, a rotatively adjustable dial carrying graduations for time measuring register with said handles, and a bushing held in an aperture in said casing and providing a radially interior bearing for said dial and a radially exterior bearing for said concentric journals.

29. In timing mechanism, in combination a casing therefor, a main timing arbor having bearing in the wall of said casing and carrying interior of said casing relatively rotatable timer parts provided with a fixed interior thrust limit on said arbor, and said arbor carrying exterior of said casing operating controls for said timer parts and adjustable thrust means to regulate the axial play between said interior timer parts.

30. In a timing mechanism, the combination with a time movement including a main spring and a winding spindle connected to wind said spring when rotated in one direction and connected to retard the action of said spring in the opposite direction, of an operating handle having positive drive engagement with said spindle in the direction to wind said spring and rotatably displaceable from said drive engagement in the opposite direction, a flow control timer, and a releasable pawl-and-ratchet drive connection between said timer and said spindle, said timer being further connected to be positively impelled by said handle in both directions of rotation.

31. In a timing mechanism, the combination with a time movement including a main spring and a winding spindle connected to wind said spring when rotated in one direction and connected to retard the action of said spring when rotated in the opposite direction, of a combined time setting pointer and spring winding handle having positive drive engagement with said spindle in the direction to wind said spring and rotatably displaceable from said drive engagement in the opposite direction to reduce the time setting without unwinding said spring, a flow control timer, and a releasable pawl-and-ratchet drive connection between said timer and said spindle, said timer being further connected to be positively impelled by said handle in both directions of rotation.

32. In a double-action interval timer including a time movement having a power spring adapted to be wound at each use of the timer, combined time setting and spring winding controls embodying a time graduated dial rotatively adjustable on the casing, a time pointer concentric with said dial and settable in register with the dial graduations to determine the interval of time before the first action of said timer, and a second time pointer also concentric with said dial and settable in register with said graduations to determine the time interval before the second action of said timer and formed as a handle and provided with connections for winding said power spring.

33. In an interval timing mechanism deriving its timing action from connection to the winding spindle of a spring driven clock movement, an interval controlling handle connected positively to rotate said spindle to a selective time setting in a direction to wind the clock spring, a stop to limit the movement of said handle as driven by said clock spindle and thereby to limit the unwinding of said spring, and means affording drive connection between said handle and said clock spindle in selective positions of said handle intermediate the time setting position of said clock spindle and the stop limited position thereof.

34. In an interval timing mechanism deriving its timing action from connection to the winding spindle of a spring-driven clock movement, a time setting handle connected positively to rotate said spindle in a direction to wind the clock spring, a stop to limit the movement of said setting handle as driven by said clock spindle and thereby to limit the unwinding of said spring, and means affording drive connection between said handle and said clock spindle in selective positions of said handle intermediate the setting of said clock spindle and the stop limited position thereof and comprising releasable connections causing said handle to be continuously returned to its stop limited position from said selective positions.

35. Double-action interval-timing mechanism embodying in combination, a clock movement including its main spring and winding spindle, a gear on said spindle, a cam carrying shaft, a gear loose on said shaft and in mesh with said spindle gear, a timing cam loosely rotatable on said shaft adjacent to said shaft gear, and pawl-and-ratchet connection between said shaft gear and said timing cam whereby the former impels the latter when rotated by said clock movement.

36. Double-action interval-timing mechanism embodying in combination, a clock movement including its main spring and winding spindle, a gear on said spindle, a cam carrying shaft, a gear loose on said shaft and in mesh with said spindle gear, a timing cam loosely rotatable on said shaft adjacent to said shaft gear, and pawl-and-ratchet connection between said shaft gear and said timing cam whereby the former impels the latter when rotated by said clock movement, together with a cam adjusting handle having means rotatable therewith and giving lost motion engagement with said cam, and operative through limited movement, relative to said cam to disengage said pawl-and-ratchet connection.

37. In combination with a time movement, its power spring, the winding arbor therefor, and a pawl-and-ratchet connected time train positively retarding the spring driven movement of said arbor while freely permitting spring winding movement thereof, a device to be timed and tensionable for automatic action, a detent for controlling said action, a timer element impellable by said time movement to condition said detent, and a time setting handle connected when moved in one direction positively to impel said timer element and by a backlash giving connection to impel said winding arbor in its spring winding direction and when moved in the other direction also positively to impel said element but through the means of said backlash without corresponding movement of said arbor, thereby to reduce the effective time setting of said element without unwinding said power spring.

38. In a double-action interval timer including a time movement having a power spring adapted to be wound at each use of the timer, combined time setting and spring winding controls embodying a time graduated dial, a pointer operative to determine one interval of time and concentric with said dial to turn in register with the dial graduations, and a second pointer operative to determine another interval of time and concentrically turnable with the first said pointer to register with said graduations, both of said pointers having handles and one of said pointers having connections for winding said power spring.

39. In a timing mechanism, in combination, two flow controls, separate time setting pointer handles by which respectively to position said controls, a mark co-operating with said pointer handles to indicate the flow affecting position of said controls, graduations to gauge the extent of displacement of said controls from said position, motive means to impel said controls to said position, and releasable drive connection between said motive means and said controls whereby the former positively impels the latter, and a stop limiting the travel of said controls after reaching their flow affecting position.

40. In a time switch mechanism, in combination, a time giving train having a power spring, a winding spindle connected positively to and impelled positively by said power spring, a plurality of ratchet toothed wheels impelled positively by said spindle, a plurality of timers impelled positively in one direction by pawls engaging with said ratchet wheels, trip members having lost motion positive propelling engagement respectively with said timers and acting on said pawls to release said timers from their said engagement with said ratchet wheels, and time setting handles for respectively manipulating said trips.

41. A double-action resettable timing mechanism, embodying in combination, a time motor, timers controlling automatic action of the device to be timed and impellable in unison by said time motor, handles connected to separately position said timers and arranged when intercepted to stop the travel of said timers and to permit continued travel of said time motor.

42. In a timing mechanism including a time movement with its driving spring, in combination, a flow operating control, pawl-and-ratchet connecting means by which said control is impellable by said movement, a handle for operating said control and impellable in unison therewith by said time movement, said handle further having connection for winding the driving spring of said time movement, and said pawl-and-ratchet connecting means being operable through pressure exerted in one direction upon said handle to disconnect said control from said time movement.

43. In a timing mechanism including a time movement with its driving spring, in combination, a flow operating control, pawl-and-ratchet connecting means by which said control is impellable by said movement, a handle for operating said control and impellable in unison therewith by said time movement, said handle further having connection for winding a driving spring of said movement, and said pawl-and-ratchet connecting means being operable through pressure exerted in one direction upon said handle to disconnect said control from said time movement, together with a stop positioned to intercept the movement impelled travel of said handle and thereby cause the latter to exert said pressure to disconnect said control.

44. In a timing mechanism in combination, a marine movement including its power spring and an oscillating escape mechanism positively connected thereto by a retarding train, an arbor rotatable in one direction to wind said spring and immovable in the opposite direction except through action of said escape mechanism and gear train, a device timing agent having releasable pawl-and-ratchet connection to said arbor to be impelled thereby in variable relation thereto, a handle operative to vary the relation of said agent to said arbor, and means whereby said handle winds the power spring of said movement.

45. In combination with a time train, its power spring and a winding arbor therefor, timing mechanism impellable by said spring and including a winding gear turning with said arbor, a timing gear in mesh with said winding gear, a time setting handle having lost motion positive drive connection with said timing gear supplemented by adjustable drive connection thereto within the limits of said lost motion.

46. In combintion with a time train, its power spring and a winding arbor therefor, a winding gear turning with said winding arbor, a time setting arbor, a timing gear in mesh with said winding gear and having lost motion drive connection with said timing arbor, a timing element having positive lost motion drive connection with said timing arbor and also having selective drive connection to said timing gear, said latter connection being releasable by movement of said timing arbor relative to said timing element.

47. In combination with a time train, its power spring and a winding arbor therefor, timing mechanism including a time setting handle impellable by positive lost motion connection to said winding arbor, and operative through said connection to wind said spring, and additional drive connection between said handle and said arbor releasable by pressure on said handle opposed to its spring impelled travel.

48. In combination with a time train, its power spring and a winding arbor therefor, timing mechanism including a time setting handle impellable by lost motion connection to said winding arbor, and also operative through said connection to wind said spring, and additional drive connection between said handle and said arbor whereby said handle may be impelled by said arbor but is not operative to wind said spring.

49. In combination with a time train, its power spring and a winding arbor therefor, timing mechanism impelled by said spring and including a time setting handle and transmission gears additional to the gears of said train whereby said handle is driven by said power spring and may be operated to wind the same.

50. In combination with a time train, its power spring and a winding arbor therefor, timing mechanism including a time setting handle impelled by lost motion connection to said winding arbor and operable to wind said spring and additional connecting means effecting the propulsion of said handle by said arbor in variable rotative positions relative thereto.

51. In combination, a time movement having a winding arbor, an escapement train regulating the speed of said arbor to approximately one revolution in six hours, a timing arbor outside said train and impelled by said winding arbor to make approximately one revolution in twelve hours, timing mechanism actuated by movement of said timing arbor, and slippable coupling means permitting a backward slippage of said timing mechanism without movement of the train.

52. In a timing mechanism, the combination with a time movement including a main spring and a winding spindle connected to wind said spring when rotated in one direction and connected to retard the action of said spring when rotated in the opposite direction, of a combined time setting pointer and spring winding handle having positive drive engagement with said spindle in the direction to wind said spring, and rotatively displaceable from said drive engagement in the opposite direction to reduce the time setting without unwinding said spring and a flow operating control element impellable by said spring through selectively variable connection to said spindle and connected to be positively impelled by said handle in both directions of rotation.

53. In a timing mechanism, the combination with a time movement including a main spring and a winding spindle connected to wind said spring when rotated in one direction and connected to retard the action of said spring when rotated in the opposite direction,—of a combined time setting pointer and spring winding handle having positive drive engagement with said spindle in the direction to wind said spring and rotatably displaceable from said drive engagement in the opposite direction to reduce the time setting, a device time, and a releasable pawl-and-ratchet drive connection between said timer and said spindle, said timer being further connected to be impelled positively by said handle in both directions of rotation.

54. In a double action interval timer including a time movement having a power spring adapted to be wound upon use of the timer, combined time setting and spring winding means embodying, in combination; a time-graduated dial turnable on a pivot; a time setting device settable in register with graduations on said dial to determine the time interval before a first action of said timer; connections whereby said device is impellable by said movement independently of the movement of said dial; and a second time setting device also impellable by said movement independently of said dial and also settable in register with graduations on said dial to determine the time interval before a second action of said timer and constructed in part as a handle and provided with connections for winding said power spring.

55. In an interval timing mechanism deriving its time action from the winding spindle of a spring driven movement, a time setting handle connected to rotate said spindle in a direction to wind the movement spring, a stop to limit the movement of said handle as impelled by said spindle thereby to limit the unwinding of said spring and means affording drive connection acting between said handle and said spindle in variable positions of said handle relative to said spindle intermediate the set position of said spindle and the stop limited position of said handle after the movement spring has been wound and comprising releasable connections causing said handle to be returned to its stop limited position in a length of time proportional to its displacement therefrom.

56. Interval timing mechanism embodying in combination, a time movement including its power spring and winding spindle, a shaft operatively associated with said spindle, a rotor loose on said shaft and driven by said spindle, a timing cam also loose on said shaft, and a releasable clutch connection between said rotor and said cam whereby the former impels the latter when rotated by the time movement.

57. In a double action interval timer including a time movement having a power spring adapted to be wound upon use of the timer, combined time setting and spring winding means embodying, in combination, a time graduated dial, a pointer operative to determine one interval of time turnable in register with graduations on said dial and a second pointer operative to determine another interval of time also turnable in register with said graduations, both of said pointers being impellable by said movement independently of said dial and having handles for manipulation, and one of said pointers having connections for winding said power spring.

58. In a timing mechanism, in combination, two action timing controls, a separate time setting pointer for positioning each of said controls, a stationary mark to indicate an absolute position of each of said controls, a series of graduations for gauging in common the extent of displacement of each of said controls from said mark, a member impelled by timing mechanism, and a separate means for coupling each of said controls to said member for being impelled by said member to said mark, said coupling means being releasable by the actuation of said time setting pointer which positions said control.

59. In combination with a time train, its power spring and a winding arbor therefor, timing mechanism impelled by said spring and including two time setting handles and two separately movable sets of timing parts operable respectively thereby, a gear positioned between said two sets of timing parts for imparting movement to each thereof, and a second gear in mesh with said first gear and connected with said time train for transmitting the movement of said train to the first said gear.

60. In settable timing mechanism including a front frame plate, in combination, a central setting shaft protruding through said plate and carrying fixed to rotate therewith both a time control member back of said plate and a time indicator in front of said plate, and a setting hub rotatable about said shaft and also protruding through said plate and carrying fixed to rotate therewith a second time control member in a position intermediate said plate and the first said time control member, and a second time indicator in a position intermediate said plate and the first said time indicator, together with a rotatable gear concentric with and positioned between said two time control members and powered by timing mechanism and clutch means arranged so that said gear may impel either of said time control members singly or in unison.

61. In a device of the character described, a dial having markings thereon indicating difference of time, said dial being mounted to be rotated, an index adjacent to the dial for indicating the markings thereon, an arm mounted to have rotary movement with respect to said dial having a portion indicating the markings thereon, means for making and breaking an electric circuit, time controlled means for rotating the said arm including a spring and winding means positively connected therewith, connections between said arm and said making and breaking means, whereby upon the arrival of said arm at a predetermined point on the dial the said means is caused to close the circuit, a second arm mounted in similar manner to the first arm, connections between it and the making and breaking means and time controlled means for rotating it with respect to the dial, the construction and arrangement of said connections being such that on the arrival of said arm at a predetermined point on the dial the said circuit making and breaking means is caused to break the circuit, said means for rotating said arms being a common means.

62. In the mechanism specified in claim 61, a connection between the said arms whereby movement of one arm may be communicated to the other, said arms having independent movement.

63. In timing mechanism for operating a controlled device, in combination, a time retarded spring-impelled rotor, an actuator for the device, a handle for said actuator and a positive driving connection operable by said handle to couple and uncouple said actuator and said rotor in variable relative positions.

64. In timing mechanism for operating a controlled device, in combination, a time retarded spring-impelled rotor, an actuator for the device, a handle for said actuator and a connection between said rotor and said actuator constructed to transmit positive drive in one direction and to permit slippage in the opposite direction and operable by said handle to couple and uncouple said actuator and said rotor in variable relative positions.

65. In timing mechanism for operating a controlled device, in combination, a time retarded spring-impelled rotor, an actuator for the device, a handle operative through said rotor to wind the rotor spring and also connected to operate said actuator and a positive driving connection operable by said handle to couple and uncouple said actuator and said rotor in variable relative positions.

66. In timing mechanism for operating a controlled device, in combination, a time retarded spring-impelled rotor, an actuator for the device, a handle having lost play connection to said actuator and a ratchet-and-pawl connection operable by movement of said handle relative to said actuator thereby to couple and uncouple said actuator and said rotor in variable relative positions.

67. In an interval timer, in combination, timer impelling mechanism, a timer returnable by said mechanism when displaced from zero position, a second timer returnable by releasable connection to said mechanism when displaced from zero position, and a controlled device arranged to be acted upon by each of said timers at respectively different times during the return of said timers to their zero positions.

68. In a timing mechanism for operating a controlled device, in combination, a time-retarded spring-impelled rotor, an actuator for the device, a handle for said actuator and a positive drive clutch operable by said handle to couple and uncouple said actuator and said rotor in variable relative positions and a stationary stop also operative upon said clutch to uncouple said actuator from said rotor at a definite position of the actuator.

69. In a multiple action timing mechanism, in combination, a time movement, two action-causing members, a device arranged to be caused to operate at respectively different times by each of said members, a connection between said members permitting said members to be adjusted relative to each other by rotative force applied to same, a separate operating handle for applying said rotative force to each of said members, said connections acting to maintain said members in constant relation when undisturbed by said handles.

RAYMOND D. SMITH.